2,906,744
INSECTICIDAL COMPOSITIONS

Andrew T. Jancosek, Hammond, Ind., and John S. Brown, Flossmoor, Ill., assignors to Standard Oil Company, Chicago, Ill., a corporation of Indiana No Drawing. Application March 15, 1956
Serial No. 571,605

5 Claims. (Cl. 260—96.5)

This invention relates to insecticidal compositions. More particularly, it relates to a novel class of compositions which combine the functions of an insecticide and a plant nutrient.

We have discovered that thiourea forms solid adducts with insecticides of the class of polychlorinated cyclic hydrocarbons and closely related organic compounds. The resulting adducts are non-hygroscopic, free-flowing, substantially non-corrosive powders having both nutritive and insecticidal properties when applied to plants, and are of special convenience in utilization, and of long-continued effectiveness.

It is an object of our invention to improve the ease of handling and application of certain insecticidal materials. Another object is to provide a polyfunctional insecticide. A further object is to reduce the corrosiveness of chlorinated cyclic insecticides. Other objects will be apparent from the following description.

It is known that thiourea forms solid adducts with certain branched-chain and cyclic organic compounds. It has not been heretofore appreciated, however, that thiourea could form adducts with substances of the structural complexity, for instance, of DDT (1,1,1-tricrloro-2,2-bis(p-chlorophenyl)ethane), and it was likewise unappreciated that the resulting adducts would be dry powders of low density and free-flowing qualities, having no tendency to absorb water, to agglomerate, or to corrode metallic surfaces.

Our new compositions can be prepared from any of the well-known polychlorinated cyclic hydrocarbons having from 6 to 16 carbon atoms in the molecule and closely related polychlorinated cyclic organic compounds, such as the alkyl ethers and thioethers thereof. Among such compounds are the following: DDT (1,1,1-trichloro-2,2-bis(p-chlorophenyl)ethane), DDD (1,1-dichloro-2,2-bis (p-chlorophenyl)-ethane), methoxychlor (1,1,1-trichloro-2,2-bis(p-methoxyphenyl)ethane), benzene hexachloride, chlordan (1,2,4,5,6,7,8,8-octachloro-4,7-methano-3a,4,7,7a-tetrahydroindane), aldrin (1,2,3,4,10,10-hexachloro-1,4,4a,5,8,8a - hexahydro - 1,4,5,8 - dimethanonaphthalene), dieldrin (1,2,3,4,10,10-hexachloro-6,7-epoxy-1,4,4a,5,6,7,8,8a-octahydro-1,4,5,8-dimethanonaphthalene), toxaphene (mixed polychlorinated bicyclic terpenes), and the like.

In preparing our new compositions, the polychlorinated cyclic insecticide substance is dissolved in a suitable solvent, the resulting solution is commingled and agitated with a suitable quantity of thiourea, and the resulting solid adduct is separated from the reaction mixture and dried. Satisfactory solvents include carbon tetrachloride, chloroform, benzene, ethyl ether, and the like. The reaction mixture should preferably include at least a small proportion (around 1 to 10 percent by weight, based on thiourea) of a thiourea solvent, preferably methanol, ethanol, acetone, or the like. The thiourea may be dissolved in such a solvent, if desired; but this is in general unnecessary. The reaction proceeds rapidly at ordinary temperatures, and is generally complete in as little as 10 to 30 minutes. Somewhat higher and lower temperatures may also be employed, e.g., from about 0 to 75° C., but in general we prefer to contact the reactants at ordinary temperature for about 0.25 to 1.0 hour. The adduct is separated from any liquid phase that may be present, and is dried at ordinary or moderately elevated temperatures up to about 75° C.

In the preparation of our adducts, we find that thiourea ordinarily reacts with polychlorinated insecticides in a weight ratio between about 2:1 and 3:1. It is therefore desirable to employ a ratio within this range in preparing the adducts in order to avoid an excess of either substance. Where it is desired, however, to minimize the hygroscopicity and/or the corrosiveness of the insectcidal material, an excess of thiourea should be employed, suitably a total weight ratio of about 3:1 to 4:1 or more. The excess thiourea is carried along with the adduct, where it serves a stabilizing function, and is ordinarily unobjectionable.

The following operating examples will more fully illustrate our invention:

Example 1

DDT (100 grams) was dissolved in 50 milliliters of carbon tetrachloride, and 5 grams of Triton X–155 (an alkylaryl polyether alcohol) were added as an emulsifier. The resulting solution was slowly stirred at ordinary temperature into 200 grams of dry thiourea containing 5 milliliters of methanol. During this procedure, the thiourea expanded greatly in volume, by a factor of around 10, evidencing the formation of a chemical combination. The resulting thiourea-DDT adduct was dried in air at ordinary temperature for 3 hours to remove the carbon tetrachloride. The powder obtained thereby was free-flowing and stable, and exhibited excellent handling characteristics.

Example 2

Chlordan (100 grams) was dissolved in 50 milliliters of carbon tetrachloride, and the resulting solution was slowly stirred at ordinary temperature into 200 grams of dry thiourea containing 5 milliliters of methanol. The resulting voluminous thiourea-chlordan adduct was dried at room temperature to a stable, free-flowing powder.

Example 3

A DDD solution was prepared by dissolving 100 grams of the insecticide in 50 milliliters of carbon tetrachloride. Activated thiourea was prepared by stirring 5 milliliters of aqueous 97% methanol into 200 grams of thiourea. The DDD solution was slowly poured into the activated thiourea with stirring at room temperature until all of the materials had been mixed. Additional methanol (5 to 10 milliliters) was added to the final mixture, and was found to improve the dryness and fluffiness of the adduct. The completed reaction product was dried at room temperature to remove solvent and methanol, leaving the desired thiourea-DDD adduct as a dry, fluffy powder.

Example 4

Methoxychlor was reacted with thiourea under the same conditions and according to the same procedure as in Example 3. The adduct was a dry, fluffy powder.

Our new compositions are especially useful in the preparation, packaging, shipping, and application of insecticides of the defined class. Many of these insecticides are corrosive to the usual types of packaging materials, whereas our adducted forms can be packaged and shipped in any type of container, even in paper bags. Many of the original insecticides are very difficult to handle and to disperse into proprietary mixtures, owing to their toxic nature and to their tendency to absorb water and to agglomerate. Our adduct compositions have none of these undesirable properties, and are readily and conveniently handled, blended, and dispersed. Our compositions are especially useful as field dusts. When applied to plants, the adducts slowly break, releasing the insecticide in an effective form, while maintaining an effective concentration over long periods of time. At the same time, the thiourea is made available as a plant food. It is, of course, feasible to apply the adducts in admixture with water in order to produce faster action. In this event, the adduct should be agitated with water to dissolve the thiourea and to emulsify the insecticide, and the resulting emulsion may then be conveniently applied as a spray.

While we have described our invention with reference to certain specific embodiments thereof, it is to be understood that such embodiments are illustrative only, and not by way of limitation. Numerous modifications and equivalents of our invention will be apparent from the foregoing description to those skilled in the art.

In accordance with the foregoing description, we claim as our invention:

1. A non-hygroscopic, free-flowing, substantially non-corrosive addition compound of thiourea and a polychlorinated cyclic organic insecticide selected from the class consisting of 1,1,1-trichloro-2,2-bis(p-chlorophenyl) ethane, 1,1-dichloro-2,2-bis(p-chlorophenyl)ethane, benzene hexachloride, 1,1,1-trichloro-2,2-bis(p-methoxyphenyl)ethane, 1,2,4,5,6,7,8,8-octachloro-4,7-methoxo-3a,4,7,7a-tetrahydroindane, 1,2,3,4,10,10-hexachloro-1,4,4a,5,8,8a-hexahydro-1,4,5,8-dimethanonaphthalene, 1,2,3,4,10,10-hexachloro-6,7-epoxy-1,4,4a,5,6,7,8,8a-octahydro - 1,4,5,8-dimethanonaphthalene, and mixed polychlorinated bicyclic terpenes.

2. A solid thiourea adduct of 1,1,1-trichloro-2,2-bis (p-chlorophenyl)ethane.

3. A solid thiourea adduct of 1,2,4,5,6,7,8,8-octachloro-4,7-methano-3a,4,7,7a-tetrahydroindane.

4. A solid thiourea adduct of 1,1-dichloro-2,2-bis(p-chlorophenyl)ethane.

5. A solid thiourea adducts of 1,1,1-trichloro-2,2-bis (p-methoxyphenyl)ethane.

References Cited in the file of this patent

UNITED STATES PATENTS

| | | |
|---|---|---|
| 2,499,820 | Fetterly | Mar. 7, 1950 |
| 2,600,431 | Rosenstein | June 17, 1952 |
| 2,637,678 | Peer et al. | May 5, 1953 |
| 2,745,826 | Semenoff et al. | May 15, 1956 |
| 2,813,851 | McKay | Nov. 19, 1957 |

FOREIGN PATENTS

| | | |
|---|---|---|
| 602,259 | Great Britain | May 24, 1948 |